Figure 1:
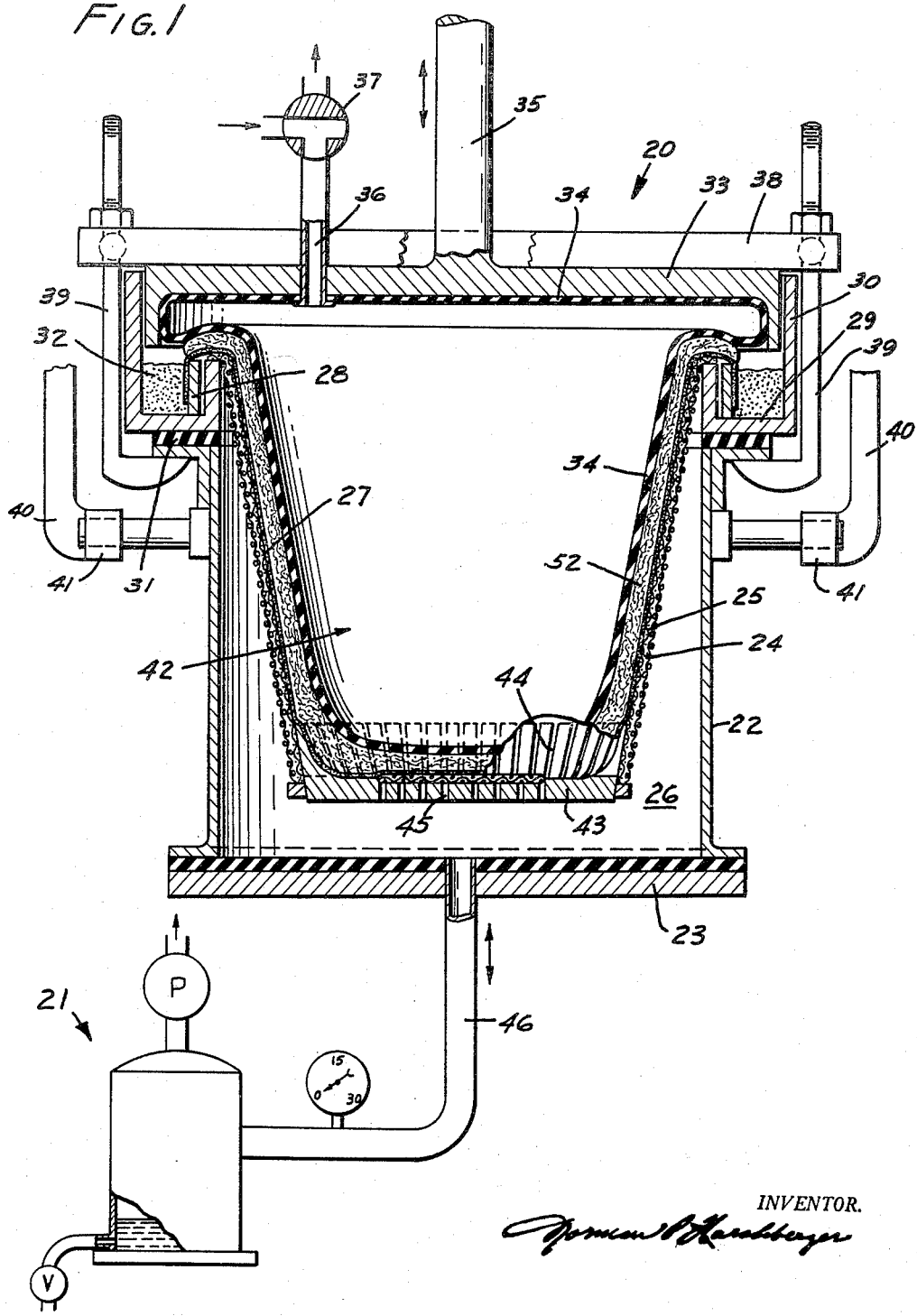
Figure 2:
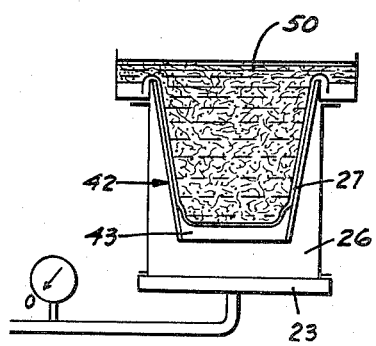
Figure 3:
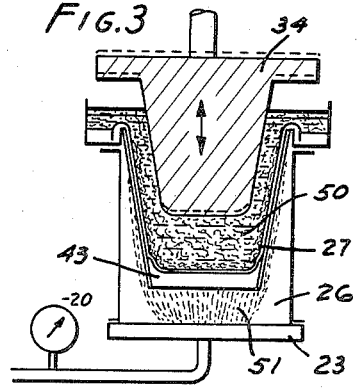
Figure 4:
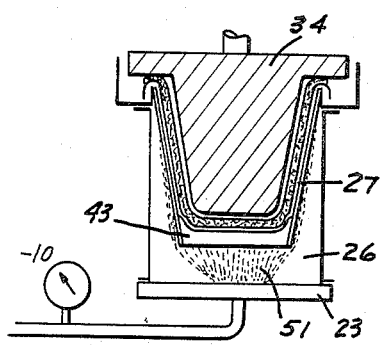
Figure 5:
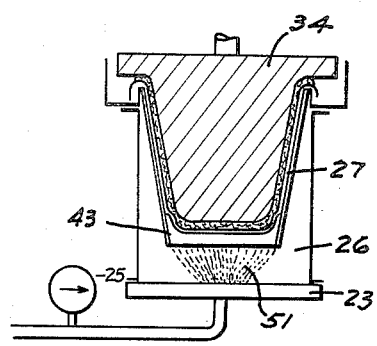
Figure 6:
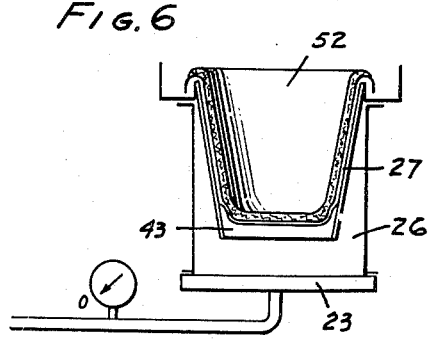

INVENTOR.
Norman P. Harshberger

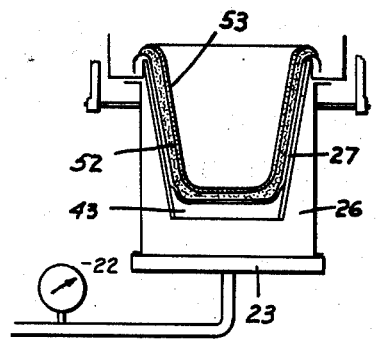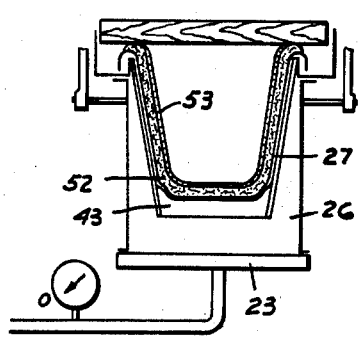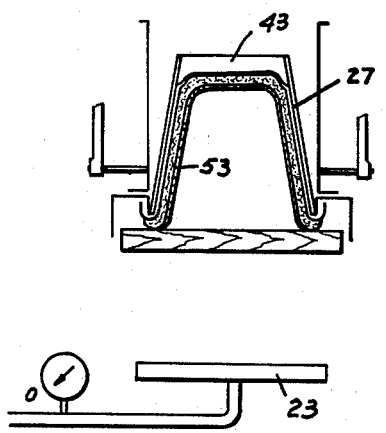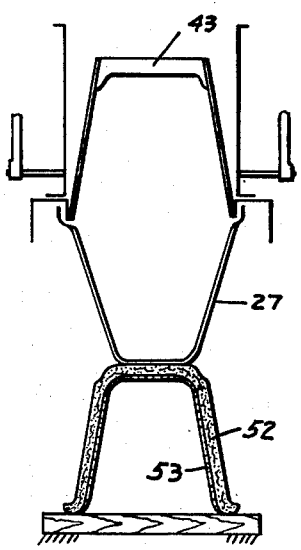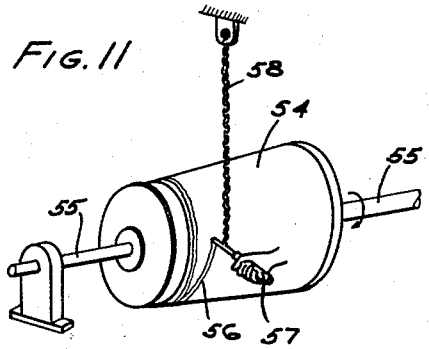

United States Patent Office 2,958,623
Patented Nov. 1, 1960

2,958,623

METHOD OF MOLDING A LOW DENSITY HIGH STRENGTH SHAPED BODY FROM A DILUTE SLURRY

Norman P. Harshberger, 1446 Las Lunas St., Pasadena 4, Calif.

Filed June 30, 1955, Ser. No. 519,168

5 Claims. (Cl. 162—136)

This invention is a continuation in part of my copending cases, Apparatus for Manufacturing a Composition Material, Serial Number 188,168, filed October 3, 1950, now Patent No. 2,722,868, issued November 8, 1955, and Roofing Product and Method of Application, Serial Number 351,949, filed April 29, 1953, and now abandoned.

More particularly, however, the present invention relates broadly to containers comprising a substantial amount of spherical glass-like multi-cellular bodies and the method of making the containers, so that they may have such properties as light weight, carry great compression loads, be non-brittle, shock resistant, and when desired, either water retaining or water repellent. Among the prospective uses are:

Underground meter boxes, shipping containers, flue pipe, refractory material, particularly, where a high degree of insulation against heat and cold is desired, together with impact resistance. Containers used as braziers, ovens, for indoor or outdoor patio use will have unique application wherein the product is formed and made of the inorganic components of this invention.

Those skilled in the art know there are many disadvantages to brittle and dense container products, and particularly in the case of large containers that must at times be packed and shipped. A brittle product is very susceptible to breakage in transit. It is also known in the art of fired clay products, and ordinary cast concrete containers, that they too are very brittle, dense and also highly heat and cold conductive. The cheapest clay pots that are not glazed, are highly absorbent (not waterproof), and generally have a preformed hole for drainage. Porosity, and the drainage provision of clay pots, however, have definite advantages in the growing of plants, though lack the combination of features embodied in my new container. In the fired clay product, it has been impractical to make the container both absorbent as well as water-proof, and still have one that will not leak. The difference in expansion of the fired clay product body, and that of the fired glazed surface, causes the surface of the ceramic product to be susceptible to surface cracking. This is due to the lack of resistance to thermal shock and different expansion coefficients of the clay and the glaze. Furthermore, in the prior art, the ordinary concrete containers are cast, or pressed into form in non-porous molds. The designs on the surface are generally, if of any appreciable depth, molded into the article when it is cast. Some containers have been made of concrete by vibration methods, and as a result, they are dense and considerable trouble is experienced in preventing cracking in handling. Consequently, leakage takes place, which causes the product to become stained and unsightly in appearance.

Containers made only of organic pulp known in the art as "papier mache," treated in various ways to make the article water-proof, lack the properties required for prolonged weathering and soon disintegrate by weather exposure, and water absorption. Moreover, the wall thickness of such containers is limited, due to the relatively slow rate at which the paper may be dewatered when so formed. Paper pulp products of that type lack rigidity and the treatment followed in the making of the containers, of my present invention.

One of the objects of this invention is to provide a product with a rapid forming rate by having a free rate of drainage, which is brought about by incorporating a large volume of perlite of a form that produces such a result.

A further object is to incorporate thermal shock and impact resistance in such products by use of perlite and fibre.

Another object is to provide a ceramic-like product that is much lighter in weight, for a given size and wall thickness, than heretofore made by the old methods and conventional components.

Still another object is to make a perlite, fibrous container, which will withstand variation in heat from 70° F. to 1,800° F. without fracturing.

A further object is to provide such a product with a density and form to suit the particular end use for which the container is to be employed, by the use of hollow sealed multi-cellular glass-like bodies of substantially spherical form, that is, as it pertains to much of such a product in its expanded form.

Another more specific object is to make containers comprising compatible components of perlite, fibres and hydraulic cement, and form to a density, that, as a composite container, permits hand carving (similar to that of wood), after the container is set and cured.

Another object is to provide compressible characteristics in the container and still be of such density that it may have designs rolled into it before it completely sets and cures.

A further object is to provide a container that will float at or near the surface of water, even when filled with plants, earth and/or water.

A further object is accomplished as my product is drying: An excessive amount of soluble salts migrate to the surface, probably in part due to its porous structure, and exposure to carbon dioxide in the air. The true color below its surface is almost unrecognizable, as the whitish salts cover its surface. By taking advantage of the cellular structure of perlite which forms in part at the surface of my product, I am able to abrade away the sealed cellular faces merely by pressure of a coarse cloth, so bringing out the color below and opening the otherwise closed cells of the exposed perlite.

The object is to abrade the surface of the container and thereby have a mechanical bond for the surface sealing with suitable coating materials. By cutting deeper into the product's surface crust (sometimes nearing the median line of the product's wall, where softer), I am able to provide a good depth of color contrast, having an object of art.

A preferred objective in most of my container applications is to provide non-brittle characteristics by intimate bond between the perlite, fibre and binders of cementing substances.

Among the objects is, in so proportioning and commingling the container constituents, as to provide an end product with substantially uniformly distributed, sealed, cellular spheres, of perlite, and having the contained perlite in sufficient volume so as to provide ready penetration and/or absorption of fluids into the interstitial portions of the container for moisture retention.

A further object is to treat the container with compatible water-proofing substances, thereby inhibiting in a substantial degree, the penetration of substantial amounts of moisture and prevent dusting of the surface after cutting designs into its face.

An important object, when a water-proof product is desired, is the manner in which the inner or outer walls of the container are treated. This has a great bearing on whether a container for plants will satisfactorily serve its end use. For example, in growing plants, many attempts have been made to make containers that will retain just the right moisture conditions for the particular plant.

My container, after being formed, without any water-proofing treatment, will take on as much as 45% of its bone dry weight, of water, even when hydraulic cement is employed as a binder for rigidification of the article. This condition is ideal for certain plants.

The preferred average density of my product is that, wherein perlite, fibre, and cement is formed as a composite container, and wherein the buoyant, sealed perlite particles are in such volume that it supports the water filled container as a buoyant body, in water, after the interstitial portions of the container become water logged (have the interstitial portions of the container filled with water).

Further detailed objectives may be seen by a study of the following: By proportioning and mixing the constituents, and sometimes during the formation of the container while still in the forming cavity, I may apply a fluid suitable to water-proof, dust-proof, set or bind the constituents. The fluid may be injected, and/or drawn into the container while being under the influence of vacuum in the dewatering step. The following results show the unexpected and remarkable rate, and amount of penetration of asphalt, into a perlite and fibre product of an apparent density of about 13.75 lbs. to a cubic foot. This treatment was attained by dipping the container into hot asphalt, of a melting point of 120° F. at a temperature of about 400° F. Of course, under the influence of vacuum, the interstitial portions would have been more completely filled. Of course, the sealed and gas filled perlite portions of the composite product would be coated only, thereby retaining a relatively low density and good strength as a result of the asphalt treatment. A far greater rate and amount of impregnation into felted composite product is shown by the following tables:

In this case the product was composed of 50 fibre (waste news pulp) and 50 perlite (parts by weight).

| Time of Dip | Weight of Sample | Weight of Saturant | Percent of Saturation (Asphalt) |
|---|---|---|---|
| 10 seconds | 6.15 | 9.45 | 154 |
| 30 seconds | 4.7 | 10.3 | 219 |
| 60 seconds | 4.6 | 13.3 | 289 |
| 120 seconds | 4.6 | 18.2 | 395 |

The perlite, or any other similar and suitable material of a glassy nature, such as volcanic ash of sealed cellular form, contributes materially in attaining the desired physical properties of the end product of this invention, as well as contributing to the most satisfactory and rapid rate of producing the article by speeding up the dewatering during the forming cycle. Perlite, as associated with fibre, appears to provide the unexpected non-fracturing character and the high degree of shock resistance, even in a wide range of density.

In the lower density range, that is, below 60 lbs. to the cubic foot, the formed and cured cement product has the highest degree of thermal shock resistance, and still maintains exceptional compression values without danger of fracture under load or in normal handling. The following load result was quite unexpected for a product of so low a density:

*Load tests* [1]

| Nominal Dimensions | @ .75× Thickness | @ .5× Thickness | Compression Strength | |
|---|---|---|---|---|
| | | | @ .75 × Thickness | (p.s.i.)@.5× Thickness |
| (A) 4″ x 4″ x .75″ | 30,200 | 138,500 | 1,890 | 8,660 |
| (B) 4″ x 4″ x .75″ | 33,200 | 150,800 | 2,080 | 9,430 |
| (C) 4″ x 4″ x .75″ | 23,100 | 103,000 | 1,440 | 6,440 |
| Average, p.s.i. | | | 1,800 | |

[1] Compression is load in pounds sustained by test specimen at point when reduced thickness resulting from compressive force was 75% of thickness of the original specimen. Compression load in pounds at point when thickness of specimen was 50% of original thickness. These specimens showed no break at either 25% or 50% reduction in thickness.

Formulation of ingredients employed in above load tests were as follows and called for the solids to be of high dilution in water, in order to disperse the fibre for intertwined felting of the fibre and perlite:

62 % Portland cement ⎫
23.4% perlite ⎬ Pressed density 30# to
10.6% asbestos ⎪ the cubic foot
4.0% kraft paper pulp ⎭

100 %

The high degree of compression strength and impact resistance is brought about by the well dispersed fibre content as intimately mixed with water, perlite and cement and as formed by vacuum and then pressed. The entrapped gas within the sealed perlite cells may account for the unexpected resistance to fracture under such great loads. I avoid the use of clay as a binding or cementing ingredient, since it drastically slows down, if not actually inhibits, the product formation. Clay also has dimensional instability when wet, and then dried. I prefer a true hydraulic cement as a binder for more fire resistant applications.

Measured amounts of the materials employed in my formula were individually and collectively filtered, by use of vacuum dewatering equipment. The following procedure was followed, in order to determine which of the ingredients contributed most, in the rate of vacuum dewatering. Clear water, at tap temperature, passed through the filter in 7 seconds. Clear water, plus 7D Grade Canadian crysatile asbestos required 5¼ minutes before the cake formed on the wire was free of surface water. A like test was made wherein an expanded perlite of an approximate density of 10 lbs. to the cubic foot (perlite size —80+150 mesh) was added to the water, and the asbestos, and thoroughly mixed. The filtering off of the surface water then took only 1¾ minutes. When cement was added (Portland), the time of losing the surface water was 2¾ minutes. When 10% colored pigment (300 mesh) by weight of the cement content of the slurry was added, it took 3¼ minutes before the surface water was withdrawn from the cake formed on the wire screen. This illustration is provided to show the importance of perlite, as it contributes to increasing the rate of filtration. While dewatering may be done by centrifugal forces set up by revolving the forming unit (cavity) I generally prefer dewatering by vacuum or a combination of centrifugal force and vacuum. In any event, substantially spherical perlite mixed with non-spherical bodies of like material, lowers the cost of producing the end product, as compared to withdrawing water from the other components without perlite. Generally, the greater the amount of perlite employed the higher the rate of dewatering, particularly when combined with cement. My product and method of forming rules out substitution of substantially non-glassy, non-cellular comminuted materials. Even though said materials be of low density, such materials do not provide the end product characteristic of perlitic volcanic rock in its expanded form. Vermiculite (a stratiform mica), diatomaceous earth, bloated clay are quite unsatisfactory as a substitute for perlite. In the forming of my product, the latter three materials provide too little of the non-absorbent and free-filtering values of the perlitic rock of the type suited to my method and product. Some relatively small amounts of vermiculite may be used to advantage if pretreated to lower its absorbent characteristics.

By the use of a combination of ingredients, it will be seen that I am able to provide a relatively light weight, non-conductive container. My product must have properties that provide a high degree of shock resistance, both thermal and impact, and must be of low weight for strength ratio. The method of forming my container is most important, if not actually essential, in attaining such high structural values for a given density.

In the preferred carrying out of my method of making my product, I first provide a large volume of water (approximately 15 to 20 times or more the weight of solid components). The fibre may be of the amosite or crysatile asbestos, or, in some cases, of the organic type. The fibres are added to the water and thoroughly dispersed by agitation, until the fibre nodules are broken up into substantially individual fibres. Into this dilute slurry (one that could not be hand molded or modeled or alone pressed to form), I add an expanded multi-cellular perlite or similar and suitable volcanic ash of a density of from 5 to 15 lbs. to the cubic foot (loose fill as poured into a cubic foot box and struck level). While these ingredients are in intimate contact, I add, with constant agitation, a suitable cement, such as Portland or a high calcium aluminate cement, both of which are classed as hydraulic cements. In certain cases where a very rapid set is desired, I mix in approximately 15% of high calcium aluminate cement with 85% of the Portland cement.

The proportions of the other ingredients may be varied over a wide range, so long as a large volume of perlite and fibre is employed. The amount of the components employed, of course, varies with their density in its relation to the amount of cement used. Otherwise, no control of the end product's density could be attained. The bulk density (apparent density) of the expanded volcanic rock or fibre materially influences the forming steps and end product characteristics.

If the bulk density is large (either fibre or perlite) for a given weight, then the cement and water must be increased to attain uniform distribution of the components. It is important to have a dilute slurry (one that could not possibled by hand modeled or formed) in order to avoid breakdown of the sealed cells of the perlite during the mixing period. It is most important to retain the sealed perlite cells for their valued use as an insulating medium in my products.

Moreover, the finer the perlite particle size, the greater the surface area; therefore, the greater amount of cementing substance is necessary to provide a given strength over weight ratio. Where I desire the lowest density product, and have less regard for the consequent increase in voids, I may employ a larger perlite particle size, such as, for example −14 +20 mesh. The disadvantage, however, in the use of such coarse material is in that it migrates badly in a relatively dilute slurry of the other components of my formula. Generally, I prefer, for better formation, the finer particle size.

Utilizing the formula proportions given in the examples of this application, and most of those of my co-pending case, Serial #351,949, filed April 29, 1953, and now abandoned, entitled Roofing Product and Method of Application, I have found satisfactory results in making containers for plants and many other uses where low weight for high strength values are to be considered.

The formulas that have been successfully employed in making my product by the present invention are:

|  | (1) Percent | (2) Percent | (3) Percent | (4) Percent | (5) Percent | (6) Percent |
|---|---|---|---|---|---|---|
| Fibre | 15 | ¹5 | 5 | 15 | 30 | 5 |
| Perlite | 30 | 35 | 30 | 5 | 15 | 10 |
| Cement | 55 | 60 | 65 | 80 | 55 | 85 |
|  | 100 | 100 | 100 | 100 | 100 | 100 |

¹ Amosite asbestos.

When I employ organic pulp (kraft or waste paper), for example, the fibre is employed in amounts great enough to have intimate fibre to fibre felting, and the particle size of the perlite must be carefully balanced to prevent parting of the composite formation during the dewatering step, while within the confines of the porous filtering device through which the water is withdrawn. In the use of some types of fibre it is highly desirable to pre-treat the fibre with a water repellent or water-proofing material, and then preferably dry it before combining with the other ingredients to prevent a deleterious effect on the cementing substance, particularly hydraulic cement. This treatment is most advantageous in the use of waste paper pulp. In order to retain the best dimensional stability in the end product, the described pre-treatment of the fibre is preferred.

When the perlite has a tendency to migrate in the dilute slurry, due in most cases to its density, or particle size and/or weight, I have found it most advantageous to impinge fibre, and sometimes cement, upon the surface of the perlite as a pre-prepared mixture. This mixture may then be used as the components in making my product, merely by the addition of sufficient water to make a dilute slurry.

To accomplish this impingement step, the perlite is slightly wetted with an adhesive, and all materials air mixed and impinged, one particle upon another, upon contact. Sometimes it is advantageous to first mix in a dry state all the components together, then wet them with water while suspended in an air stream. Either of these methods prevent migrations of the perlite in the forming steps that follow in making my product.

The most satisfactory fibre for most of the end uses is of the inorganic type such, for example, as amosite and crysatile, asbestos or glass fibre. In processing, one cannot always use equal weights of the three types and expect similar results. Several unexpected results were discovered in replacement of one type of fibre for another. The bulk density and mixing requirements of the respective fibres vary widely as do the physical properties of asbestos and glass fibre. The handling of fibre is particularly important, as it concerns its use with perlite and hydraulic cements. In some cases I found that 5% amosite asbestos provided as much tensile strength weight for weight as compared to 15% by weight of crysatile of comparable fibre length. Untreated organic fibre materially slows down the set of hydraulic cement in most cases. Untreated organic fibre is sometimes deleterious as it concerns ultimate strength of the end product.

Amosite has greater affinity for Portland cement than cysatile asbestos. Availability of amosite, at a reasonable price, however, has restricted its use in my products. It has superior value in my product formulations, however, and is sometimes preferred.

A peculiar and unexpected property of amosite was observed in making felted sheets of amosite, in that, contrary to the usual behavior of a crysatile asbestos sheet formed by depositing a slurry on a dewatering surface, and then dried, it would shrink. In the case of amosite asbestos, the reverse result was observed. The sheet containing amosite asbestos expanded upon drying. On examination of the wet fibre under a microscope, it was noted that the fibre became crinkled throughout its length when wet, and upon drying, appeared to take substantially a straight line form. That may account for the unusual result of the sheet actually expanding, rather than shrinking upon being dried. There is an advantage in this respect wherein hydraulic cements and perlite are used with the amosite asbestos, in that it appears that the amosite offsets some of the normal drying shrinkage encountered in the product as the hydraulic cement sets and cures. The end product also has greater wet strength when amosite asbestos is the fibre component.

The greatest strength over weight ratio plus heat resistance is attained with:

From 5% to 15% by weight of amosite asbestos
From 30% to 35% volcanic ash or perlite (about 10# expanded apparent density to a cubic foot loose fill)
From 50% to 65% calcium aluminate cement Less aluminate cement is required for a given strength over weight ratio than when Portland cement is used. Therefore, the product may be made lighter in weight for the given strength by the use of high calcium aluminate cement. It is not known specifically why greater strengths are attained with calcium aluminate cement versus the Portland type. It may be that it has to do with the greater adherence to the perlite and the asbestos as the cement hydrates and sets, or it could be that it comes of the aluminous cement combining with a larger amount of water, with a consequent reduction in voids. Moreover, an aluminous cement as combined with the other components of this invention, and as made by the wet and highly dilute slurry, results in a product with less tendency to show efflorescence or bloom, than when any of the other available hydraulic cements are employed.

These, and other objects and features of the invention, relating to the improved article, the method of producing and processing the same, the method of producing ornamentation on containers will be obvious and will be pointed out in the subsequent detailed description and in the appended claims taken in conjunction with the accompanying drawings wherein:

Figure 1 is an elevational view, partly in section, of a preferred form of a device which is used to produce my invention.

Figures 2 to 10 inclusive, are diagrammatical sectional views of the device in Figure 1 showing the preferred consecutive steps in the method of producing my invention.

Figure 11 is an isometric elevation of a means for decorating my invention.

Referring particularly to Figure 1, the preferred embodiment of my device for forming containers is comprised of a mold 20 and a conventional vacuum dewatering system 21. The said mold 20 has an outer casing 22 and a bottom plate 23, together with a conical coarse screen 24 and a fine conical screen 25 which form a vacuum chamber 26. Within said screen 25 is disposed a porous cloth bag 27 supported at the top by a ring 28 which is in turn supported in a groove 29 of a top member 30. Disposed between said top member 30 and casing 22 is a resilient gasket 31. A sealing compound 32 fills the said groove 29 to seal off passage of fluid between said ring 28 and said member 30.

Fastened on the underside of a plunger plate 33 is a resilient expandable bladder 34. An actuating rod 35 supports said plate 33. An air supply tube 36 forms a passage from inside the said bladder 34 to a two-way valve 37. Hold down clamp 38 with adjustable swivel hooks 39 serve to clamp the said plate 33, the said top member 30 tightly to the said casing 22. A sling 40 (partially shown) supports the said mold 20 by swivel connections 41.

A mold cavity 42 is formed by a perforated and slotted conical bottom plate 43 and said conical screens 24 and 25. Slots 44 and holes 45 formed in said plate 43 allow air passage from the mold cavity 42 to the said vacuum chamber 26.

A vacuum line 36 communicates from said plate 23 to said conventional vacuum dewatering system 21.

In forming my containers, I deposit the pre-mixed slurry 50, Figures 2 to 5, in a suitably shaped, porous cavity 42, around which there is a vacuum chamber 26 for withdrawal of the water 51. While withdrawing water 51, the said slurry 50 is forming on the faces of the bag 27 and bottom of the said porous cavity 42. The shape, density and wall thickness of my container is regulated by having the slurry displaced, agitated, and maintained at the proper level in the said cavity 42 as the water recedes. This is accomplished by a displacement plunger or bladder 34 that is preferably agitated within the said cavity 42 so as to move the slurry up to the rim of the cavity, maintaining a water seal for as long a period as required, consistent with the wall thickness and sectional form desired for the end product. When agitated, the displacement means, avoids to a substantial degree, migration of the components during the forming cycle, and further reduces undue stress in the formed article during the last stage of dewatering.

Moreover, I find that the use of the displacement means facilitates the retention of a higher vacuum for the longest interval during the forming and dewatering cycle, since that displacement means raises the water level and seals the otherwise open porous portions of the product so as to avoid loss of vacuum. As a result of maintaining a high water lever for a period, the solids are then more evenly distributed during formation and while the desired amount of water is being withdrawn from the container. Moreover, by that means, more water is withdrawn, with less stress on the formed article or container 52 (Figure 1) in the area where the drainage is the slowest.

Any suitable displacement means may be used to raise the level of the slurry, to agitate it, or otherwise orient the components on the faces of the cavity in which the container is formed. The use of the displacement means, particularly when it, itself, is agitated within the slurry, substantially aids, if not prevents out of course migration of the perlite. When the agitation is properly controlled, the best surface condition is attained for further treatment in consolidating and sealing of the walls of the formed product, with water-proofing materials while still drawing off air and water by the use of the dewatering equipment.

The best results for a relatively dense and smooth wall is to form the product as follows:

(1) Premix the components as a dilute slurry.
(2) Deposit the mixed slurry in the porous cavity, see Figure 2.
(3) Displace and preferably agitate the deposited slurry, see Figure 3. Application of vacuum, as shown by gauges in Figures 2 to 10 which are relative only, then dewaters the product being formed at a rapid rate, so little or no migration of the components from one another takes place, see Figure 4.
(4) Then apply pressure from within the cavity of the partially dewatered container, see Figure 5, preferably while the product is still under the influence of vacuum, and while in its wet form in the dewatering cavity.
(5) After pressure is applied, preferably by a displacement means, such as an inflatable bladder 34, formed to the outline of the cavity, the displacement means is then subjected to filling with a fluid (gas, air, oil, etc.), to expand the bladder and effect consolidation of the partially dewatered product at the desired pressures. A sponge rubber, covering the pressure displacement plunger (not shown), when saturated with a water-proofing material permits such treatment of the product, and saves the withdrawal of the plunger for the coating as set forth in (6) in part.
(6) The vacuum is then temporarily released and the displacement bladder is withdrawn in this step, see Figure 6, so as to allow for water-proofing 53, Figure 7, of the walls of the container. The vacuum is again brought into play, see Figure 7, for the purpose of drawing into the pressed walls of the container the desired water-proofing substance, which then penetrates and fills the surface voids, as the air is withdrawn from the interstitial portions of the surface.

(7) The product is then removed for curing, see Figures 8, 9, 10.

It has been found that the use of a cloth bag 27, mounted and fitted within, and close to the walls of the porous cavity materially assists in removal of the relatively wet-formed containers after release of the vacuum. This bag is mounted in a manner so that the bag comes out of the porous cavity with the formed container, see Figure 10, and is then readily stripped off the container, leaving the porous cavity relatively free of solids from which the product has been made. The bag is readily cleaned at desired intervals by water under pressure, and is then ready for reuse.

I have found that when I water-proof the product with wax emulsion prior to consolidating by pressure, and while the product is in the forming cavity, that surprisingly large fissures open in the areas of the container as the product is under the influence of vacuum. It appears that the wax drawn into the more wet, and less dense portions of the unpressed product causes defelting of the fibre as first oriented about the cement and perlite. At any rate, I prefer to apply the water-proofing treatment while, or after the product is subjected to pressure, and while still in the forming cavity. In that procedure I found complete satisfaction in having a water retaining container.

To retain a high degree of insulation against heat and cold, as well as to retain ample resistance to crushing and impact, I have found, as stated, that the interstitial voids may preferably be as great as 45% of the container's mass. The following formula was followed in attaining that particular percentage of voids as formed by vacuum and pressure:

30% 7.D. crysatile asbestos fibre (Canadian standard).
15% Perlite of about 5 lb. apparent density per cubic foot.
55% hydraulic cement.
100%

When the container is used as a jardinier, it is desirable to provide for enough water retention, so the container will not leak. To accomplish that result, many water-proofing substances may be used so long as they have no adverse effect on the components of the container or potted article. Polystyrene and many of the plasticised rubber-like synthetic resins may be employed in solution or emulsion form. Polyester resins, which set without substantial loss of water, are prefered in some cases, since they are more readily hardened with little need for heat transfer into the voids which the polyester product penetrates. Of course, coal tar pitch, asphalts and other water-proofing materials may be used with varying degree of satisfaction, depending upon the end use of the container.

Preheating the prepared slurry of the solid components to 140° F. to 180° F. in forming my container cuts down the forming cycle to about half the time as when run at 70° F., everything else being constant; that is, as to formulation of the product components. The longer the components have been in water, the slower the rate of dewatering, except perlite. Heated water, or heated perlite, or a combination thereof, materially contributes to a rapid rate of product formation at a given product wall thickness. The wetting of the surfaces with water-proofing materials is also enhanced by the heating of the container components both during formation and after drying the product.

Heating the components of my formulations, as set forth, is preferred except in the event of using high aluminous cement, such as:

| | Percent |
|---|---|
| Silicon dioxide ($SiO_2$) | 6.3 |
| Oxide of iron ($Fe_2O_3$) | 15.4 |
| Aluminum oxide ($Al_2O_3$) | 38.1 |
| Titanium oxide ($TiO_2$) | 2.2 |
| Calcium oxide (CaO) | 36.0 |
| Sulphur trioxide ($SO_3$) | .2 |
| Magnesium oxide (MgO) | 1.0 |
| Insoluble residue | .6 |

The above hydraulic cement hydrates best at room temperature, and liberates little or no free lime to over alkinilize the soil used in my containers for propagation of plants. It is sometimes desirable to grow plants in containers which may "breathe" (which are not sealed and which are not water containing), in the sense that the container will leak when not water-sealed on the inside or out. Where no such water-seal is required, I prefer to use a high aluminate cement or neutralize the Portland cement. Neutralizing is accomplished by treatment with an acid after the product sets and cures. Almost any acid will do, with tannic acid preferred, especially where a distinctive color is required.

After the containers have taken their final set and dried, they may be abraded by any suitable method such as shown in Figure 11 by rotating the container 54 on a mandril 55, and cutting rings 56 with a gauge 57 suspended on a chain 58.

By this method of abrading the surface, depth of color is attained and when the product is treated with one or more of the saturants or coatings which may contain colored pigments or dye, the product is then less susceptible to showing surface discolorations as exposed to the weather.

Boring holes in my containers is also an easy hand job, even with a pocket knife. This makes ready for adequate drainage when desired.

Since many variations may be made from the illustrative details given, without departing from the scope of the invention, it is intended that the invention should be limited only by the terms of the claims interpreted as broadly as consistent with novelty over the prior art.

What I claim is:

1. A method of forming a low density high strength shaped body comprising the steps of making a dilute slurry composed of 5 to 30% asbestos fiber, 5 to 35% light-weight inorganic filler, 55 to 85% hydraulic cement, and 15 to 20 parts of water to the solids, agitating the slurry in a porous mold and immediately applying a vacuum to the mold and drawing water from the slurry to form a shaped body in the mold before the solids migrate from their dispersed state, applying pressure to the body formed in the mold while continuing the vacuum, releasing the vacuum and applying further pressure to said body, releasing the vacuum and withdrawing the body from the mold, and curing said body at atmospheric temperature and pressure.

2. A method as in claim 1, further comprising, immediately prior to withdrawing said body from said mold, the steps of coating the walls of said body with water-proofing material, and reapplying the vacuum to said mold to draw the waterproofing material into said body.

3. A method as in claim 2, comprising applying said further pressure to densify said body to about from 15 to 60 pounds per cubic foot.

4. In a method of treating particulate materials which comprise cellular volcanic rock, hardenable hydraulic cement and fibre, the improvement comprising the steps of wetting said materials while held in suspension in water, drawing said particulate materials onto a substantially vertical surface at a rate which will substantially prevent off course migration of the cellular component, consolidating all of the particulate materials on said surface, applying to said consolidated materials a fluid waterproofing material, removing said materials from said surface with substantial elimination of visible fissures therein, and allowing said hardenable cement to hydrate and set.

5. A method of treating particulate materials which comprise cellular volcanic rock, hardenable hydraulic cement and fibre, the improvement comprising steps of wetting said materials while held in suspension in water, drawing said particulate materials onto a substantially vertical surface at a rate which will substantially prevent off course migration of the cellular component, consolidating all of the particulate materials on said surface, removing said materials from said surface with substantial elimination of visible fissures therein, and allowing said hardenable cement to hydrate and set.

References Cited in the file of this patent

UNITED STATES PATENTS

| | | |
|---|---|---|
| 1,779,229 | Fricke | Oct. 21, 1930 |
| 1,968,489 | Jenkins | July 31, 1934 |
| 2,079,664 | Seigle | May 11, 1937 |
| 2,116,198 | Hawley | May 3, 1938 |
| 2,149,879 | Mitchell | Mar. 7, 1939 |
| 2,175,715 | Denning | Oct. 10, 1939 |
| 2,307,629 | MacIldowie | Jan. 5, 1943 |
| 2,626,864 | Miscall | Jan. 27, 1953 |
| 2,634,207 | Miscall | Apr. 7, 1953 |
| 2,634,208 | Miscall | Apr. 7, 1953 |
| 2,681,599 | Palese | June 22, 1954 |
| 2,699,097 | Binkley | Jan. 11, 1955 |